United States Patent [19]
McKeen

[11] 4,235,678
[45] Nov. 25, 1980

[54] SOLAR POWERED WATER DESALINATION SYSTEM WITH A REGENERATIVE FIXTURE

[76] Inventor: Joseph E. McKeen, Box 1306, Long Beach, Calif. 90801

[21] Appl. No.: 887,750

[22] Filed: Mar. 17, 1978

[51] Int. Cl.³ ............................. C02B 1/06; F24B 3/02
[52] U.S. Cl. ................................. 202/185 R; 202/205; 202/233; 202/234; 203/11; 203/100; 203/DIG. 1; 203/DIG. 4
[58] Field of Search ............... 203/DIG. 1, DIG. 20, 203/DIG. 17, DIG. 4, 11, 91, 100; 202/234, 205, 185 A, 185 R, 233, 235

[56] References Cited

U.S. PATENT DOCUMENTS

| | | | |
|---|---|---|---|
| 138,375 | 4/1873 | Brown | 202/185 A |
| 2,490,659 | 12/1949 | Snyder | 203/DIG. 1 |
| 2,636,129 | 4/1953 | Agnew | 203/DIG. 1 |
| 2,969,637 | 1/1961 | Rowekamp | 203/DIG. 1 |
| 2,975,107 | 3/1961 | Friedman | 203/DIG. 1 |
| 3,104,210 | 9/1963 | Mount | 203/DIG. 1 |
| 3,232,846 | 2/1966 | Kimmerle | 203/DIG. 1 |
| 3,468,762 | 9/1969 | Klitzsch | 203/20 |
| 3,522,152 | 7/1970 | Osdor | 203/11 |
| 3,558,436 | 1/1971 | Foley et al. | 202/234 |
| 3,699,006 | 10/1972 | Hasslacher | 203/DIG. 1 |

*Primary Examiner*—Wilbur L. Bascomb, Jr.
*Attorney, Agent, or Firm*—Dominick Nardelli

[57] ABSTRACT

A low pressure, low temperature, solar powered evaporating-condensation system to provide relatively large scale conversion of brackish and seawater to fresh water, utilizes a solar radiation frequency selective material covered evaporation chamber, a throat connected elevated condenser containing energy transferring devices for vapor volume reduction to form a condensate which flows through a water-locked barometric leg to maintain the system at the sub-atmospheric pressure. The system is regenerative and includes means whereby the energy removed from the vapor during condensation is returned to the evaporating chamber and is again utilized in the cycle. Egress valves and locks are provided to maintain balanced flower of raw water, condensate and ejection of residuals. Suitable elevation of the condenser above the evaporator would provide for power generation.

3 Claims, 4 Drawing Figures

BRINE DISCHARGE

SOLAR POWERED WATER DESALINATION SYSTEM WITH A REGENERATIVE FIXTURE

FIELD OF THE INVENTION

This invention relates to a system for converting sea or brackish water into fresh water and, more particularly, to such a system that is solar powered and operated at low pressures and temperatures and preferably that is also regenerative and is capable of generating usable energy.

BACKGROUND OF THE INVENTION

There are many systems in operation to convert sea or brackish water into fresh water. Some of these systems operate below atmospheric pressure; some of these systems utilize solar energy; and some are regenerative. However, none are known that combine the best features of the low pressure system, of the solar powered system, and of the regenerative system into one system to produce fresh water at a rate and cost that is much better than any one system. In addition, none of the prior art systems have the ability to generate power and provide density separation and ejection of scale from the elements by electrical means.

OBJECTS OF THE INVENTION

An object of this invention is to supply solar energy to vaporize sea water without the use of a heat transfer surface and has a regenerative means for reclaiming and reusing energy.

Another object of this invention is to provide an enclosure to vaporize sea water, which enclosure is maintained at a vacuum without the use of pumps.

Another object of this invention is to provide a desalination low pressure system which utilizes solar energy to evaporate the water which then rises to an elevated condenser forming fresh water condensate having potential energy which is utilized in the system.

These and other objects and features of advantage will become more apparent after studying the following description of some of the embodiments of my invention together with the appended drawings.

DETAILED DESCRIPTION OF THE DRAWINGS

Figure 1:
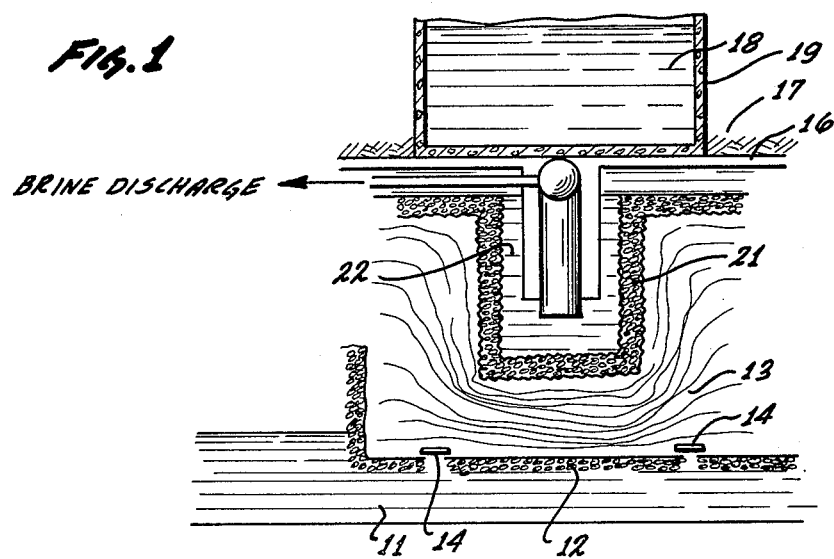
FIG. 1 is a plan partial view of my novel system shown at a greatly reduced scale.

Referring to FIG. 1 there is shown a plan view of my novel distillation or desalination system. The ocean is represented by item 11 wherein a breakwater 12 is constructed to form a tidal basin 13 which is preferably shallow to allow efficient heating by the sun. Within the breakwater there is provided at least one tide lock 14 constructed in a standard manner to allow the basin 13 to be filled at high tide and the lock 14 prevents the sea water in the basin 13 to flow back into the sea during low tide. A seawall 16 divides the basin 13 from land 17 whereon is constructed a fresh water storage means or a lake 18 having a liner 19 made of, for example, concrete. Although FIG. 1 shows only a fragment of the beach, one understands that the tidal basin 13 does not necessarily extend the full length of the shore line as it only extends to the left end right as viewed in FIG. 1, as would be practical. One of the functions of this basin 13 is to provide "quiet water" which can be preheated by the sun. Within the basin 13 is constructed a U-shaped wall 21, substantially as shown, wherein the wall 21 is porous to sea water and acts as a screen to prevent large solid objects from entering a salt water storage means or lake 22 enclosed by the wall 21.

Figure 2:
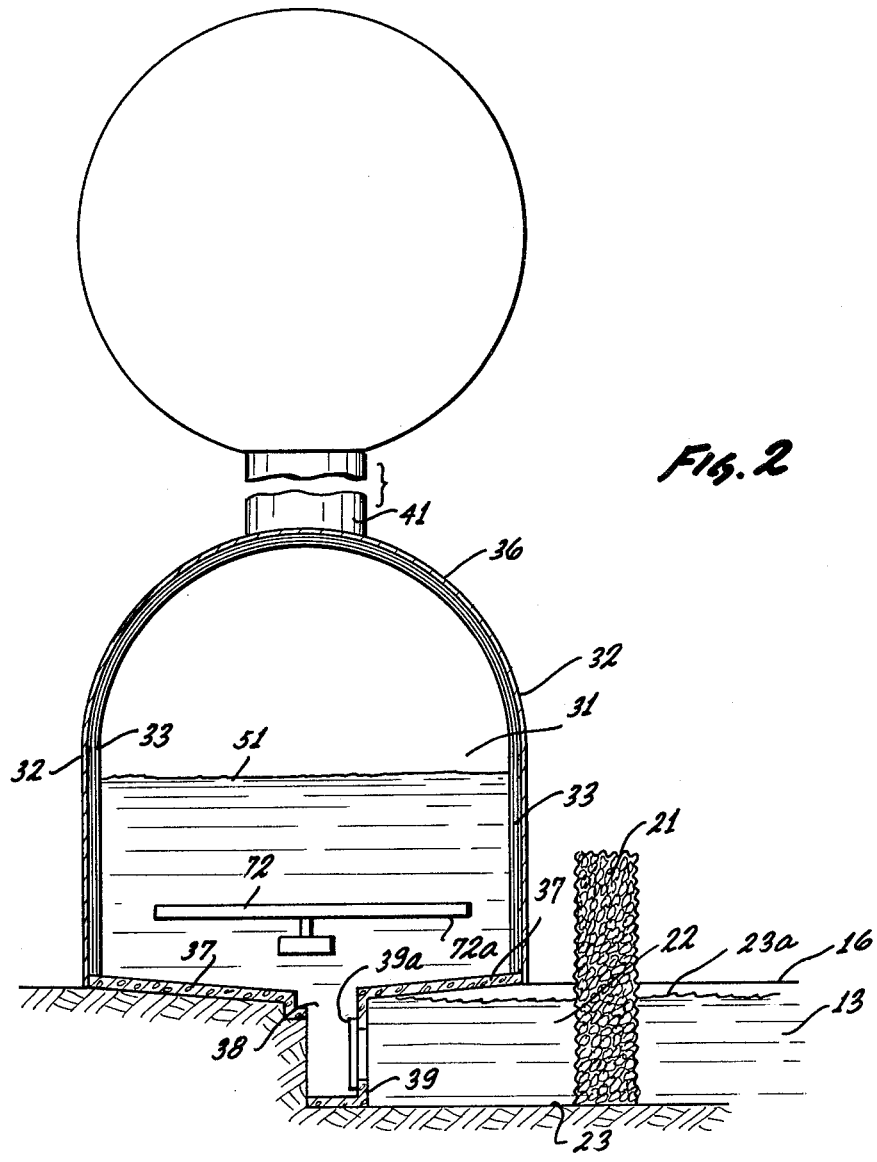
FIG. 2 is an elevation in partial section of the system shown in FIG. 1, taken from the view looking up from the bottom of FIG. 1.

FIG. 2 shows an end elevation thereof in a larger scale, with the filter wall 21, shown only on the right side, dividing the salt water lake 22 from the tidal basin 13. Item 23 is the bottom of the lake 22 and the basin 13, while item 23a is the surface thereof. Constructed partially within the salt water lake 22 and partially on land is an evaporation tank 31 which is vacuum tight and made of, for example, a corrosion resistant metal 32 at its bottom and sides which are, in turn, reinforced by suitable stiffeners 33. The outside of metal 32 may be coated with a suitable heat insulator (not shown). Sides 32 are parallel and closed with a pair of end walls 34 and 34a (FIG. 3) which are preferably semi-circular at their top. The stiffeners 33 are also semi-circular or arched at the top. The tank 31 is covered by a semi-cylindrical member 36 made of a standard material which is transparent to the sun rays, preferably, more transparent in the violet and ultraviolet part of the spectrum than in the red and infrared for reasons that will become apparent hereinafter. The tank 31 has a bottom 37 which slopes downward towards the center, as shown in FIG. 2, to form a sump 38 shown disposed at the land end of the tank. At the sea end thereof, there is formed a keel 39 that sets down into lake 22 and has suitable gates 39a. One understands that in FIG. 2 the left side represents the tank 31 over the land and the right side over the lake. However, the tank is symmetrical.

Figure 3:
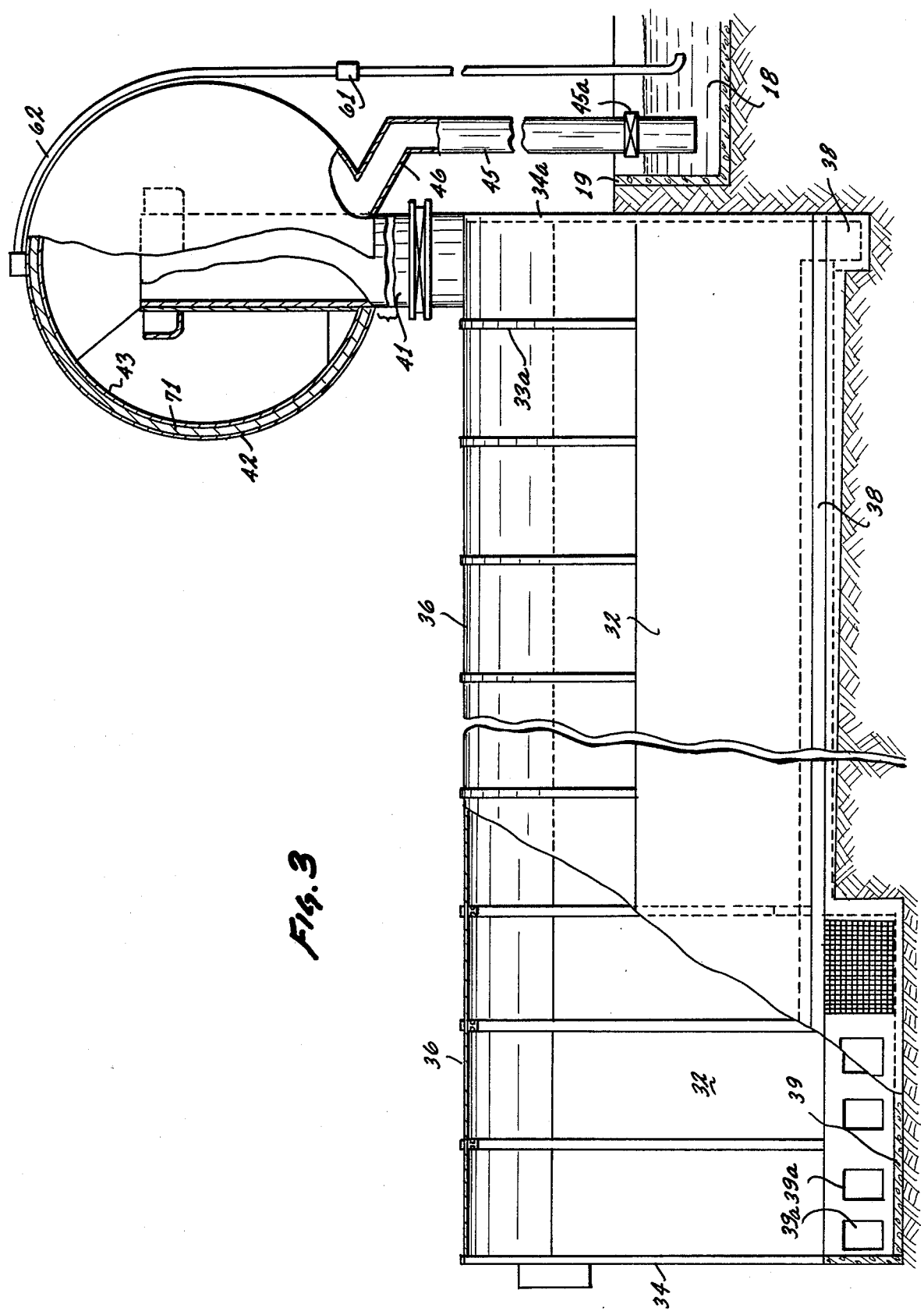
FIG. 3 is also an elevation in partial section of the system taken from the view looking from the right to left of FIG. 2.

At the land end of the tank 31 there is constructed a relatively large diameter vertically disposed tube 41 which communicates with the interior of the tank 31. Preferably, the tube 41 terminates at its lower end where it meets the semi-cylindrical top 36. If one prefers, the portion of the top 36, for example, from a stiffener 33a to the land end 34a may be made also of a strong, noncorrosive steel suitably stiffened to support tube 41 and a condensation sphere 42 fixed on the top thereof. Tube 41 extends into the sphere, preferably to a point above the center thereof. The sphere 42 is also suitably stiffened by stiffeners 43 (FIG. 3). The function of the stiffeners will become more apparent hereinafter. Near the region where the sphere 42 contacts tube 41, a barometric leg or standpipe 45 communicates therewith by an incline tube 46. The lower end of the standpipe 45 is submerged below the level of the fresh water in lake 18.

The operation of the system:

The system operates by having sea water enter the tank 31 through valves 39a (FIG. 2) and then forming a vacuum by standard means within the tank 31 and inherently within sphere 42. In this embodiment, a standard aspirator 61 (schematically shown in FIG. 3) performs this function by being suitably coupled to the top of the sphere 42 by pipe 62 and to a pressure water source (not shown) which obviously would be also coupled to the aspirator so that the air from within the tank 31 and this water from the pressure water source flows down through the lower portion of pipe 62 which terminates in lake 18. This causes the fresh water in the lake 18 to rise within the standpipe 45. At the same time, sea water is allowed to enter through gates 39a until the sea water level reaches approximately to a line 51 (FIG. 2) in tank 31. However, a vacuum is formed until the water line in standpipe 45 is about 30 feet above the water line in lake 18. The aspirator 61 is turned off and pipe 62 is suitably sealed to the atmosphere, for example, by the head of water therein. If a greater height of water is desired in pipe 45, a valve 45a therein can be closed and water pumped into the top of pipe 45 by suitable means, not shown. The sun rays enter the tank 31 through its top 36 causing the sea water within the tank to become warmer and increasing the vapor pressure therein. The interior of sphere 42 is coated with a heat energy absorbing means 71 which causes the vapors therein to condense within sphere 42. To further increase the production of fresh water, the means 71 is, for example, a black lining firmly adhering to the metal enclosing many closely spaced thermopiles (not shown) which generate an electric current by well known means. The electric current generated by the thermopiles is coupled by suitable means such as wires, not shown in the drawings, to a means herein in the form of a resistor element 72 (FIG. 2) disposed near the bottom and within tank 31 to further heat the sea water. Most of the condensate that is formed within the sphere 42 collects on the bottom thereof to flow out of the tube 46 into the barometric leg 45 and, in turn, into the lake 18 when valve 45a is opened. To prevent scale from being formed on element 72, an anode 72a may be coupled thereto to place a positive charge on the element 72.

DESCRIPTION OF ANOTHER EMBODIMENT

Figure 4:
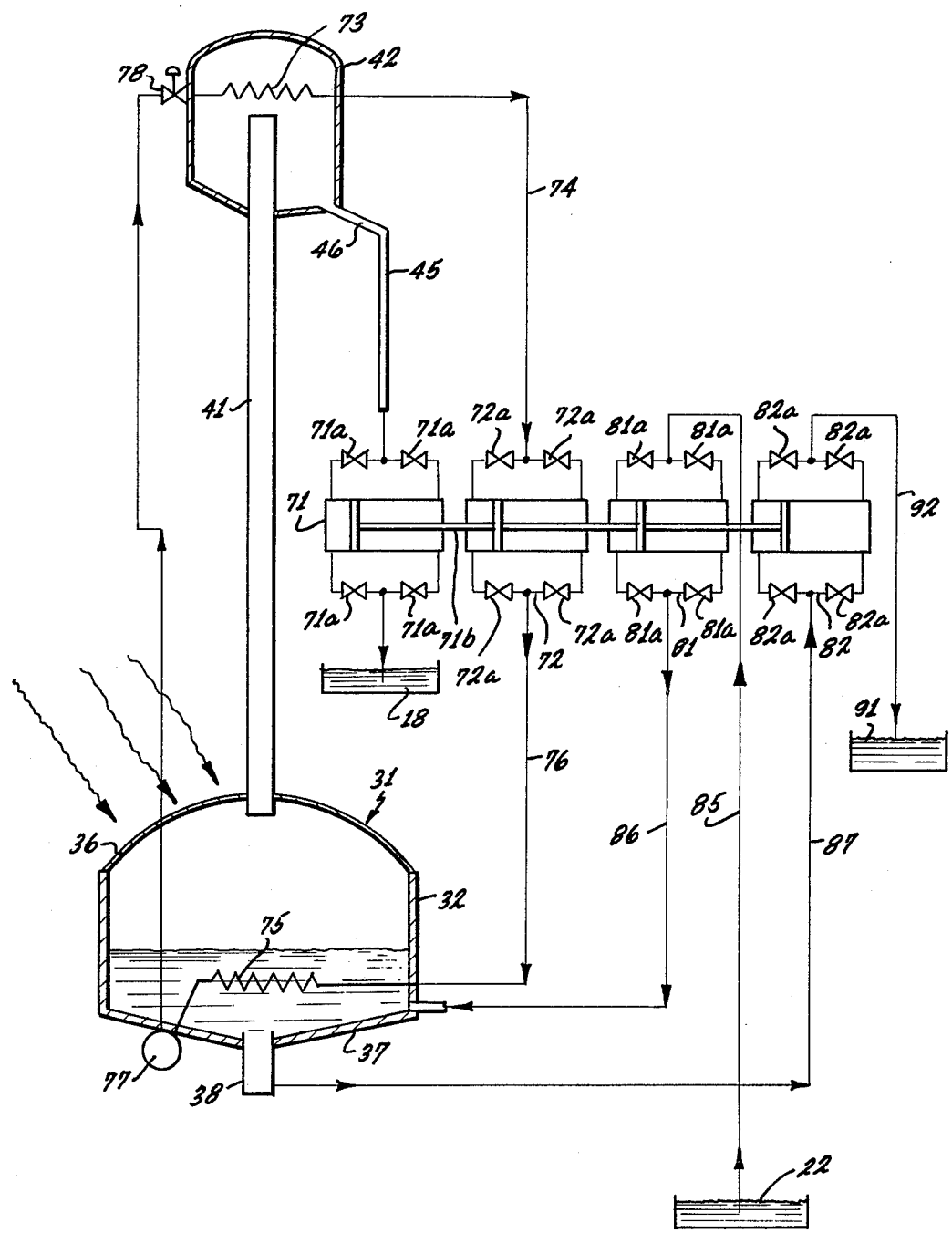
FIG. 4 is a piping schematic of the system using a refrigeration cycle for the regenerative means.

Referring to FIG. 4 wherein like numerals represent the same or similar items as in the above described embodiment, the standpipe 45, instead of extending straight through into the fresh water lake 18, as in FIG. 3, couples the fresh water through an hydraulic engine 71. Engine 71 is shown schematically and is of the piston and cylinder type that is common in the art, having controlled valves 71a. Naturally, the elevation of the condensation sphere 42 above the engine 71 is relatively large so that energy may be transferred to the engine 71. Shown coupled to engine 71 by its piston rod 71b is a hydrocarbon (HC) refrigerant pump or compressor 79, also of the piston and cylinder type, having flapper valves 72a. The intake valves 72a are coupled to an HC evaporator 73 disposed in sphere 42 through a pipe 74. The outlet valves 72a are coupled to an HC condenser 75 disposed within the brine solution in tank 31 through a pipe 76. Naturally, an HC liquid accumulator 77 is provided and an expansion valve 78 to complete the refrigeration system.

In addition, rod 71b couples a sea water pump 81 and a brine pump 82 to engine 71. Pump 81 has flapper valves 81a wherein the inlet valves 81a are coupled to the sea lake 22 through pipe 85 while outlet valves 81a are coupled to the tank 31 through pipe 86. Brine pump 82 has flapper valves 82a wherein the inlet valves 82a are couplet to the sump 38 through pipe 87 while outlet valves are coupled to a brine storage 91 through a pipe 92. One skilled in the art could now understand how the engine 71 and pumps 79, 81, and 82 operate. As a brief explanation, the potential energy of the fresh water in standpipe 45 causes the piston in engine 71 to oscillate back and forth and, in turn, the respective pistons in pumps 79, 81, and 82 oscillate back and forth. If the system was designed to provide sufficient potential energy to the fresh water by simply increasing the height of tube 41, more than enough power can be developed by engine 71 to operate the pumps 79, 81, and 82 to do their respective required functions. In addition, the absorption of solar energy by tube 41 increases as its length increases to increase production. A suitable hydrocarbon for the refrigeration system is propane, as it condenses to a liquid at sea water temperature as found in tank 31. One notes, as in FIG. 2, wherein resistors 72 are elevated above the bottom 37, so is HC condenser 75 elevated. This causes the more concentrated brine to fall into the sump 38 where it can be pumped out. As before, the anode metal is also coupled or coated onto condenser 75 to prevent the formation of scale. Since tank 31 is holding a vacuum, one skilled in the art would be able to substitute an engine for seawater pump 81.

One understands that a turbine engine can also be used, instead of the piston type 71, to drive the centrifugal pumps instead of the piston pumps 79, 81, and 82. If one finds that more fresh water is generated than is needed to drive the pumps, rod 71b can be extended to couple to a crank and drive a generator (not shown).

Having described only two embodiments of my invention, one skilled in the art, after reading the above described embodiments, can devise other embodiments without departing from the spirit of my invention. Therefore my invention is not to be considered as limited to the disclosed embodiment, but includes all embodiments falling within the scope of the appended claims.

I claim:
1. A water desalination system comprising:
   a vacuum tight tank having a semi-cylindrical top made of a material that is transparent to the suns rays and more transparent to the violet and ultraviolet parts of the spectrum than the red and infrared parts of the spectrum;
   a condensation sphere disposed at a higher elevation than said tank;
   a tube connecting said tank to said sphere so that any vapor within said tank rises into said sphere to be condensed therein;
   a barometric leg coupled to said sphere so that any condensed water therein flows into said leg;
   first means for storing fresh water disposed at a lower elevation than said sphere and with the lower end of said leg submerged below the surface of said fresh water;
   second means for forming a vacuum within said tank;
   third means exposed to the atmosphere for storing sea water so that said sea water absorbs solar energy;
   fourth means for coupling sea water from said third means into said tank;
   fifth means disposed within said sphere to absorb heat therein;
   sixth means disposed within said tank and submersed within said sea water to supply heat to said sea water;
   seventh means for transporting energy from said fifth means to said sixth means.
2. The system of claim 1 wherein:
   said tube extends vertically from said tank;

said tube enters said sphere into the bottom thereof and extends into said sphere;

said barometric leg is coupled to said sphere at the lower area thereof so that the condensate flow out of said sphere into said leg.

3. The system of claim 2 wherein:

said tube is made higher than the height that atmospheric pressure will maintain water therein;

an engine disposed coupled to said leg to be driven by said water falling within said leg;

a compressor pump driven by said engine to compress gas refrigerant so that it can be converted to a liquid refrigerant;

said fifth means is an evaporator;

said sixth means is a condensor;

said seventh means is piping connecting the outlet of said pump to said condensor, said condensor to said evaporator, and said evaporator to the inlet of said pump.

* * * * *